(12) United States Patent
Laing

(10) Patent No.: US 7,083,735 B2
(45) Date of Patent: Aug. 1, 2006

(54) HIGH DEBRIS CONTENT STRAINER

(76) Inventor: David A. Laing, 217 Northfield Dr., Elyria, OH (US) 44035

( * ) Notice: Subject to any disclaimer, the term of this patent is extended or adjusted under 35 U.S.C. 154(b) by 287 days.

(21) Appl. No.: 10/654,210

(22) Filed: Sep. 3, 2003

(65) Prior Publication Data

US 2005/0045568 A1    Mar. 3, 2005

(51) Int. Cl.
  *B01D 33/46*    (2006.01)
  *B01D 33/50*    (2006.01)
(52) U.S. Cl. .................. 210/791; 210/798; 210/391; 210/393; 210/396; 210/456
(58) Field of Classification Search ................ 210/791, 210/797, 798, 407, 408, 409, 410, 411, 412, 210/413, 414, 415, 456
See application file for complete search history.

(56) References Cited

U.S. PATENT DOCUMENTS

| | | | |
|---|---|---|---|
| 148,557 A | 3/1874 | Gillespie et al. | |
| 556,725 A | 3/1896 | Farwell | |
| 740,574 A | 10/1903 | Kohlmeyer | |
| 793,720 A | 7/1905 | Godbe | |
| 810,020 A * | 1/1906 | Applegate | 210/396 |
| 1,512,977 A * | 10/1924 | Depue | 210/392 |
| 2,167,322 A * | 7/1939 | Cuno et al. | 210/392 |
| RE21,639 E * | 11/1940 | Trinkle | 210/415 |
| 2,243,559 A * | 5/1941 | Griffith | 210/327 |
| 2,275,958 A * | 3/1942 | Hagel | 210/408 |
| 2,352,303 A * | 6/1944 | Young | 210/217 |
| 2,525,135 A * | 10/1950 | Huff | 425/85 |
| 3,029,951 A * | 4/1962 | Cannon | 210/298 |
| 3,168,467 A * | 2/1965 | Dreyer | 210/108 |
| 3,244,281 A * | 4/1966 | Kurz et al. | 210/784 |
| 3,286,843 A * | 11/1966 | Kraissl, Jr. | 210/332 |
| 3,338,416 A | 8/1967 | Barry | |
| 3,511,374 A * | 5/1970 | Beal | 209/258 |
| 4,090,965 A * | 5/1978 | Fuchs | 210/151 |
| 4,220,540 A * | 9/1980 | Hagihara | 210/415 |
| 4,315,820 A * | 2/1982 | Mann et al. | 210/408 |
| 4,655,937 A * | 4/1987 | Hendrix | 210/772 |
| 5,152,891 A * | 10/1992 | Netkowicz et al. | 210/408 |
| 5,164,079 A * | 11/1992 | Klein | 210/186 |
| 5,183,568 A * | 2/1993 | Lescovich | 210/360.1 |
| 5,356,541 A * | 10/1994 | Wickzell | 210/791 |

(Continued)

FOREIGN PATENT DOCUMENTS

CH         22 863         12/1990

*Primary Examiner*—Robert James Popovics
(74) *Attorney, Agent, or Firm*—Caesar, Rivise, Bernstein, Cohen & Pokotilow, Ltd.

(57) ABSTRACT

A high debris content strainer that utilizes a cylindrically-shaped screen having four removal assemblies positioned evenly around the screen periphery. Each removal assembly includes a backwash spray bar on the downstream side of the screen and a scraper/brush and discharge tube on the upstream side of the screen where the debris lodges during filtering. The screen is rotatably-mounted inside a strainer housing. A shroud surrounds ¾ of the screen periphery and includes an opening directly adjacent an input fluid flow line, as well as scoops on opposing sides of the shroud. The shroud evenly distributes the contaminated fluid flow around the screen. When cleaning the screen is desired, the screen is rotated while the backwash spray bars are activated and, in combination with the scraper/brushes, the debris is dislodged from the upstream surface of the screen and directed into the discharge tubes which divert the contaminants to a discharge pipe.

6 Claims, 2 Drawing Sheets

U.S. PATENT DOCUMENTS

| | | | |
|---|---|---|---|
| 5,370,791 A * | 12/1994 | Lescovich et al. | 210/107 |
| 5,384,045 A * | 1/1995 | Chmielewski et al. | 210/354 |
| 5,401,396 A * | 3/1995 | Lescovich et al. | 210/108 |
| 5,423,977 A | 6/1995 | Aoki et al. | |
| 5,443,726 A * | 8/1995 | Steiner et al. | 210/393 |
| 5,464,542 A * | 11/1995 | Grienberger et al. | 210/784 |
| 5,554,284 A * | 9/1996 | Bartelt et al. | 210/356 |
| 5,595,655 A | 1/1997 | Steiner et al. | |
| 5,632,907 A * | 5/1997 | Norbury | 210/787 |
| 5,667,683 A * | 9/1997 | Benian | 210/409 |
| 5,683,583 A * | 11/1997 | Deskins | 210/410 |
| 5,824,229 A * | 10/1998 | Larkey et al. | 210/741 |
| 5,989,419 A * | 11/1999 | Dudley et al. | 210/169 |
| 6,103,132 A * | 8/2000 | Seyfried et al. | 210/791 |
| 6,136,202 A * | 10/2000 | Foreman | 210/741 |
| 6,156,213 A * | 12/2000 | Dudley et al. | 210/791 |
| 6,177,022 B1 | 1/2001 | Benenson, Jr. et al. | |
| 6,270,669 B1 * | 8/2001 | Bauer | 210/237 |
| 6,337,013 B1 * | 1/2002 | Koopmans et al. | 210/232 |
| 6,517,722 B1 | 2/2003 | Benenson, Jr. et al. | |
| 6,666,976 B1 * | 12/2003 | Benenson et al. | 210/784 |
| 6,676,834 B1 * | 1/2004 | Benenson et al. | 210/323.2 |
| 6,712,981 B1 * | 3/2004 | Benenson et al. | 210/785 |
| 6,861,004 B1 * | 3/2005 | Benenson et al. | 210/785 |
| 2005/0045568 A1 * | 3/2005 | Laing | 210/791 |

* cited by examiner

HIGH DEBRIS CONTENT STRAINER

BACKGROUND OF THE INVENTION

1. Field of Invention

This invention relates generally to filter devices and, more particularly, to filters for fluid flows having high debris content.

2. Description of Related Art

It is well-known that the mechanical cleaning of a filter surface can be accomplished by having a brush or scraper drag along the filter surface where deposits have accumulated.

In certain configurations, the brush or scraper is mounted at one end between two walls but with a significant portion of the brush or scraper projecting beyond the walls. Such configurations are shown in U.S. Pat. No. 148,557 (Gillespie et al.); U.S. Pat. No. 556,725 (Farwell); U.S. Pat. No. 740,574 (Kohlmeyer) and U.S. Pat. No. 793,720 (Godbe). In conventional filter systems, the particulate contaminants are driven off the filter surface and are deposited in a hopper or tank along with the fluid being filtered, thus discarding large amounts of the fluid being filtered.

The use of a brush, or high speed cleaning spray, disposed between a pair of walls for cleaning a cylindrical filter is known in the art, as is disclosed in U.S. Pat. No. 5,423,977 (Aoki et al.) and U.S. Pat. No. 5,595,655 (Steiner et al.) and Swiss Patent No. 22,863 (Zingg). Another variation employs a backwash that drives the particulate contaminants off of the cylindrical filter, as is disclosed in U.S. Pat. No. 3,338,416 (Barry).

A specialized application of such filters is for fuel oil filtering in ships. Prior art ship fuel oil systems use conventional filter cartridges for cleaning the fuel in-line. However, these filter cartridges require frequent replacement which, in turn, requires the fuel flow to be interrupted during replacement. Interruption of the fuel oil flow will shut down the ship's main engines, thereby rendering the ship incapable of maneuvering. This can be catastrophic where the ship is in tight quarters, e.g., during docking or navigating through narrow passageways, or during storms, or during battle with regard to warships. Furthermore, there are additional costs of having to store sufficient replacement cartridges onboard, the logistics involved in shipping and disposing the cartridges to and from the ship, and the labor costs involved in replacing the cartridges. Examples of strainers that pertain to such environments are those shown in U.S. Pat. No. 6,177,022 (Benenson, Jr. et al.) and U.S. Pat. No. 6,517,722 (Benenson, Jr. et al.).

However, there remains a need for filtering a fluid flow containing a large amount of debris that permits the filter to be cleaned thoroughly while minimizing interruption to the filtering process.

All references cited herein are incorporated herein by reference in their entireties.

BRIEF SUMMARY OF THE INVENTION

A strainer for filtering a contaminated fluid flow having a high debris content. The strainer comprises: a cylindrical porous member disposed in the contaminated fluid flow and has a first outer surface upstream of the flow and a second inner surface downstream of the flow, wherein the high debris content lodges against the first outer surface and wherein the cylindrical porous member defines an inner region; a plurality of debris removal assemblies disposed around the periphery of the cylindrical porous member; a shroud that substantially surrounds the periphery of the screen for evenly distributing the contaminated fluid flow around the screen and wherein the shroud comprises apertures to permit portions of the contaminated fluid flow to pass therethrough; and wherein the plurality of debris removal assemblies are positioned between the cylindrical porous member and the shroud.

A method for removing debris from a strainer positioned in a first fluid flow having high debris content therein. The method comprises the steps of: disposing a cylindrical porous member in the first fluid flow to capture the high debris content against a first outer surface of the cylindrical porous member as the first fluid flow makes contact with the first outer surface; positioning a plurality of debris removal assemblies around the periphery of the cylindrical porous member; positioning a shroud, having apertures, around a portion of the screen to evenly distribute the contaminated fluid flow and wherein the shroud surrounds the plurality of debris removal assemblies; and rotating the cylindrical porous member to dislodge the high debris content that lodges against the first outer surface.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
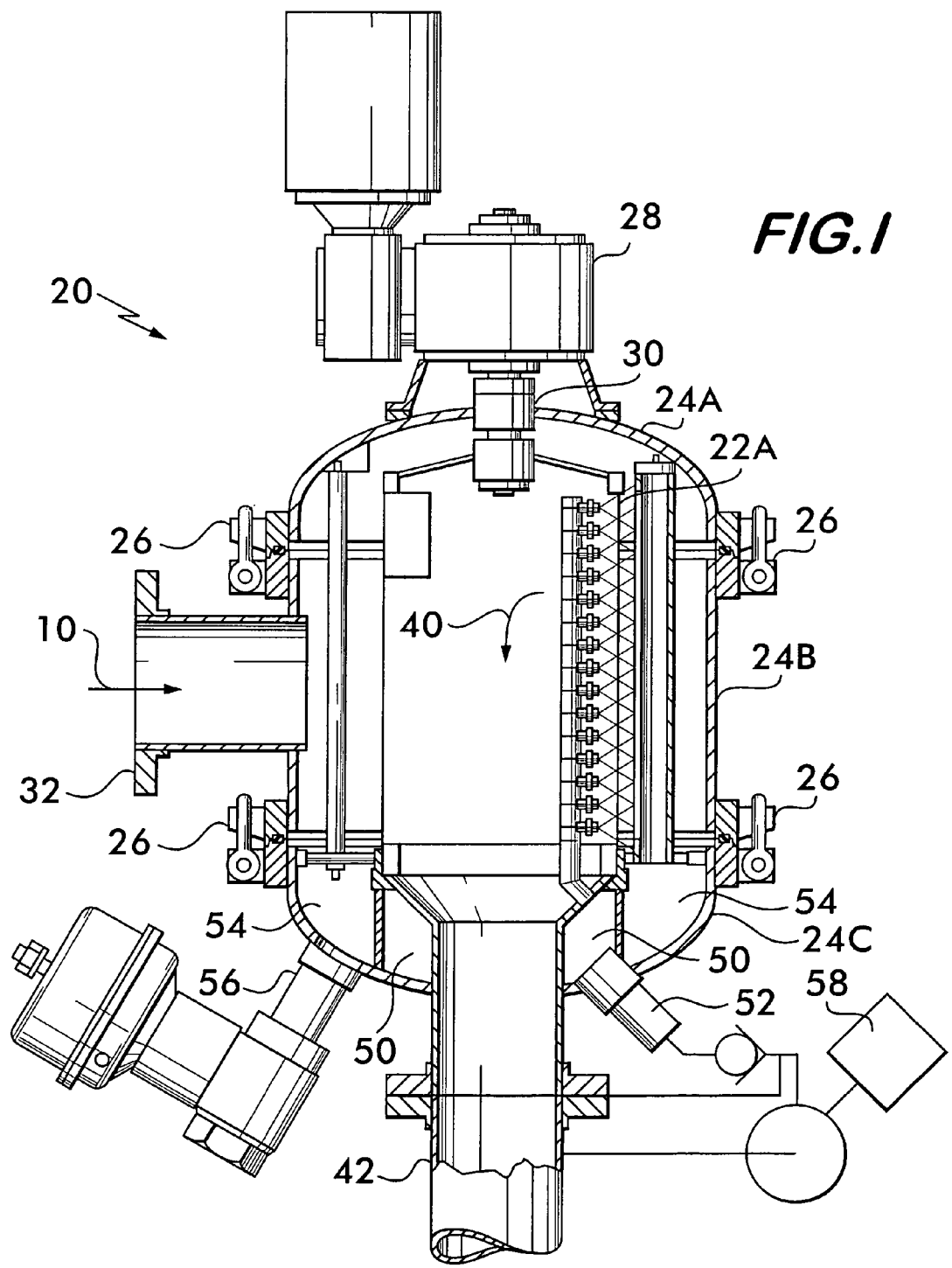
FIG. 1 is a cross-sectional view of the present invention installed in a fluid (e.g., water) flow system.

The present invention 20 is a high debris content strainer which is designed to handle a fluid flow, (e.g., water) with a higher amount of solid material than is normal for a strainer.

The strainer 20 achieves this by comprising more screen area than is typical for the fluid flow rate and by including four debris removal assemblies (e.g., discharge tube and brush/scraper, and even a backwash spray) around the screen.

In particular, the present invention 20 comprises a cylindrically-shaped strainer screen 22 (e.g., a $\frac{1}{32}$ inch screen) that is rotatably-mounted inside a strainer housing which comprises an upper shell 24A, a central shell 24B and a lower shell 24C that are releasably-coupled to each other using speed clamp devices 26. A motor 28 (e.g., 1 HP motor) and spindle 30 effect the rotation of the strainer screen 22; a controller, not shown, controls the operation of the motor 28.

Figure 2:
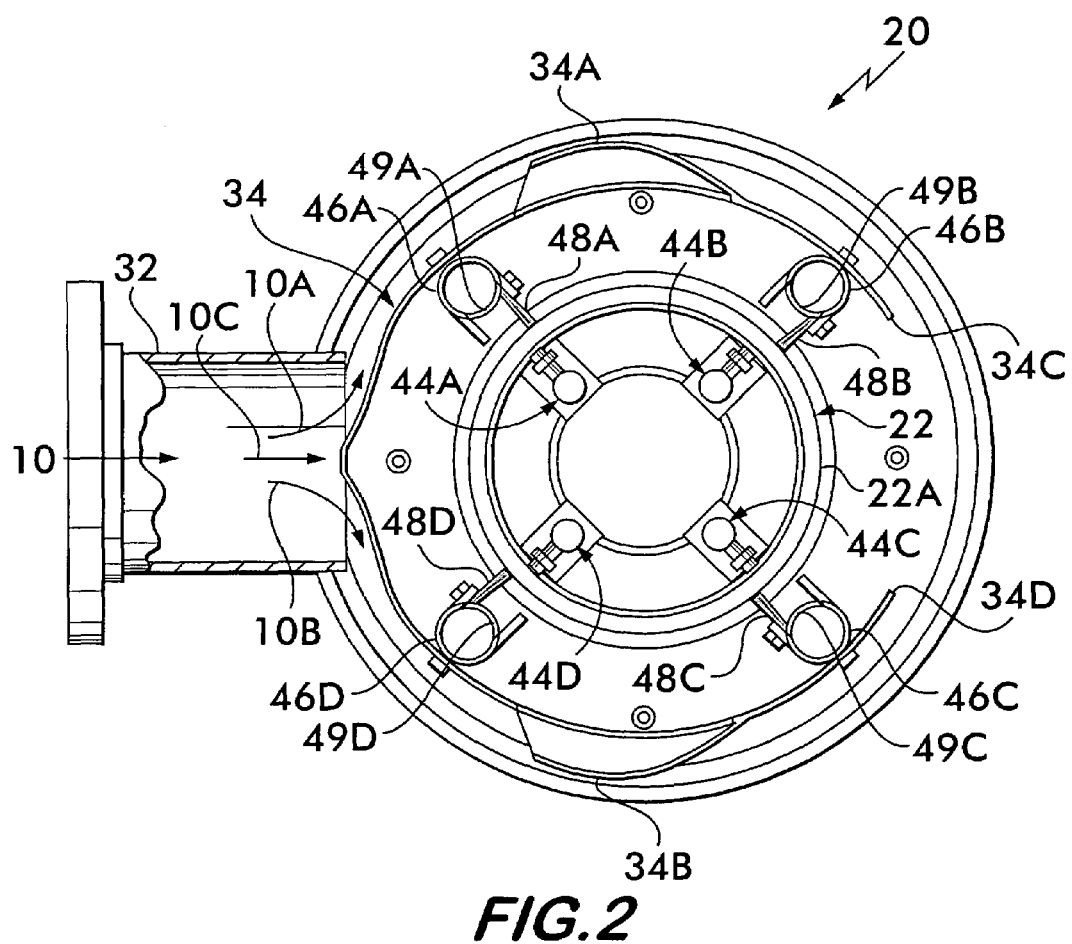
FIG. 2 is a top view of the present invention showing the top portion removed, thereby revealing the four discharge tubes.

The contaminated fluid flow 10 enters the strainer 20 via an input pipe 32 (e.g., 6 inch ANSI inlet) which is in fluid communication with the central shell 24B in through the side connection. As best shown in FIG. 2, after entering the strainer 20, the contaminated fluid flow 10 encounters a shroud 34 (e.g., $\frac{1}{8}$ inch thick material) which serves to distribute the contaminated fluid flow 10 more evenly over the entire screen 22 surface, as indicated by the arrows 10A/10B. The shroud 34 includes an opening (not shown) directly in front of the inlet pipe 32 which guides a first 25% of the contaminated fluid flow 10 in the center of the inlet pipe 32 (see arrow 10C) to the screen 22 sector nearest the inlet pipe 32. The remaining 75% of the contaminated fluid flow 10 travels outside of the shroud 34 where scoops 34A/34B on each side guide a respective 25% of the contaminated fluid flow 10 to each of the middle sectors of the screen 22. The last 25% of the contaminated fluid flow 10 continues to the screen 22 sector on the far side to form an opening defined by shroud ends 34C/34D. As a result, the shroud 34 wraps three-fourths of the way around the screen 22, thereby preventing the deposition of the high debris content on the screen 22 sector nearest the input pipe 32. The opening (not shown) in the shroud 34 nearest the inlet pipe 32 comprises a size that is approximately ¼ of the inlet pipe 32 area. Thus, as the contaminated fluid flow 10 encounters the screen 22 at the different sectors, the high debris content (not shown) lodges against the outside screen surface 22A and the cleaned fluid flow (indicated by the arrow 40) passes downward to an outlet pipe 42 (e.g., 6 inch ANSI outlet).

The strainer 20 also comprises backwash spray bars 44A–44D inside the screen 22 positioned to wash the lodged high debris content into respective discharge tubes 46A–46D just before respective scrapers/brushes 48A–48D (located closely-adjacent the outside screen surface 22A and which also run the length of the screen 22) mechanically dislodge the high content debris from the outside screen surface 22A. FIG. 1 shows one of the backwash spray bars, including a plurality of nozzles (e.g., 5/62 spray nozzles) applying cleaned downstream fluid as backwash. When the backwash is applied and the scraper/brush contacts the debris, the dislodged debris is driven into the discharge tube through an opening (49A–49D) that runs the length of each discharge tube 46A–46D. Thus, the four removal assemblies are preferably positioned 90° from each other around the periphery of the screen 22.

Positioned around the outlet pipe 42, there are two annular chambers concentric to each other. The inner chamber 50, just outside the outlet pipe 42, is where the backwash spray bars 44A–44D are each supplied with the cleaned downstream fluid. This chamber 50 is supplied with the cleaned fluid through a supply pipe 52 (e.g., 1 inch pipe) entering the bottom strainer shell 24C. The outer concentric chamber 54 is where the discharge tubes 46A–46D convey the dislodged debris which then exits this chamber 54 via a discharge pipe 56 (e.g., 2 inch pipe) through the bottom strainer shell 24C. A boost pump 58 (e.g., 7.5 HP pump) may be provided to a sufficient backwash pressure (e.g., 210 feet at 90 gpm) to backwash spray bars 44A–44D.

During high content debris filtering, the screen 22 is normally stationary. When cleaning of the screen 22 is desired, the motor 28 is activated by the controller. Typically, this achieved by providing a differential pressure transducer (not shown) that is coupled between the contaminated fluid input flow and the cleaned fluid output flow. When a high differential pressure is detected, indicating a high build-up of debris against the outer screen surface 22A, the controller energizes the motor 28 to rotate the screen 22 while activating the backwash spray bars 44A–44D. Alternatively, the cleaning process can be manually-controlled where the screen 22 is continuously rotated while filtering the contaminated fluid flow 10.

It should be understood that although the strainer 20 is depicted as having three sections 24A–24C, this is by way of example only and that it is within the broadest scope of the invention to include other design variations, known to those skilled in the art, of a housing for such a strainer to operate in the manner described.

While the invention has been described in detail and with reference to specific examples thereof, it will be apparent to one skilled in the art that various changes and modifications can be made therein without departing from the spirit and scope thereof.

What is claimed is:

1. A method for removing debt from a strainer positioned in a first fluid flow having high debris content therein, said method comprising the steps of:
    disposing a cylindrical porous member in the first fluid flow to capture the high debris content against a first outer surface of said cylindrical porous member as the first fluid flow makes contact with said first outer surface;
    positioning a plurality of debris removal assemblies around the periphery of said cylindrical porous member;
    positioning a shroud, having apertures, around a portion of said screen to evenly distribute the contaminated fluid flow and wherein said shroud surrounds said plurality of debris removal assemblies; and
    rotating said cylindrical porous member to dislodge the high debris content that lodges against said first outer surface.

2. The method of claim 1 further comprising the step of sending a reverse flow of a clean fluid through a second inner surface and said first outer surface of said cylindrical porous member to evacuate said dislodged debris from returning to said first outer surface.

3. The method of claim 1 wherein said step of positioning a plurality of debris removal assemblies comprises:
    disposing a scraper or brush that runs the length of said first outer surface closely-adjacent said first outer surface; and
    disposing a discharge tube having an opening running the length of said discharge tube adjacent said scraper or brush and wherein said opening faces said first outer surface.

4. The method of claim 2 wherein said step of positioning a plurality of debris removal assemblies further comprises disposing a backwash spray bar adjacent a second inner surface of said cylindrical porous member and wherein said backwash spray bar includes nozzles that are directed at said opening of said discharge tube.

5. The method of claim 1 wherein said step of positioning a plurality of debris removal assemblies around the periphery of said cylindrical porous member comprises positioning four debris removal assemblies 90 degrees from each other around the periphery of said cylindrical porous member.

6. The method of claim 1 wherein said step of positioning a shroud, having apertures, around a portion of said screen comprises:
    positioning an opening in said shroud that is located at an inlet where the contaminated fluid flow first comes into contact with said shroud; and
    positioning a pair of scoops on opposite sides of said shroud.

* * * * *